United States Patent [19]

Vidmar et al.

[11] 3,850,224
[45] Nov. 26, 1974

[54] PROCESS AND APPARATUS FOR DRYING SHELL MOLDS

[75] Inventors: Albert Vidmar, Mentor; John M. Webb, Chagrin Falls, both of Ohio

[73] Assignee: Sherwood Refractories, Inc., Cleveland, Ohio

[22] Filed: July 30, 1973

[21] Appl. No.: 384,105

[52] U.S. Cl. ............... 164/4, 164/26, 164/154, 164/166
[51] Int. Cl. ............................................. B22c 9/14
[58] Field of Search ............. 164/4, 12, 25, 26, 154, 164/165, 166

[56] References Cited
UNITED STATES PATENTS

| | | | |
|---|---|---|---|
| 2,932,864 | 4/1960 | Mellen et al. | 164/26 |
| 2,964,810 | 12/1960 | Van Embden et al. | 164/25 |
| 3,191,250 | 6/1965 | Mellen et al. | 164/154 |
| 3,429,358 | 2/1969 | Tingquist et al. | 164/26 |
| 3,602,288 | 8/1971 | Trench et al. | 164/26 |

Primary Examiner—Andrew R. Juhasz
Assistant Examiner—John E. Roethel
Attorney, Agent, or Firm—Bosworth, Sessions & McCoy

[57] ABSTRACT

The quality and reliability of refractory shell molds are greatly improved and the cost of manufacture is reduced in a unique drying tunnel system having an improved arrangement for circulating and conditioning the air and a novel impact drying system arranged to provide faster, more uniform and more thorough drying by use of air jets without causing premature drying or overheating problems. The novel equipment is relatively inexpensive and provides better drying conditions and more reliable control and increases the maximum rate of production which can be achieved with air conditioning equipment of a given size.

22 Claims, 9 Drawing Figures

PROCESS AND APPARATUS FOR DRYING SHELL MOLDS

The present invention relates to a process and apparatus for drying shell molds used in the "lost-wax" process for casting of precision metal parts and, more particularly relates to an improved drying tunnel system which provides fast, economical, mass production of refractory shell molds of exceptional quality while at the same time minimizing the number of inferior molds that are produced.

For more than 15 years shell molds have been mass produced using wax patterns, dipping and dusting equipment and drying tunnels of the general type disclosed in U.S. Pat. No. 2,932,864, filed June 17, 1958. The process of this patent has for many years been considered the best available because it made it possible to mass produce shell molds of better quality at lower cost, but the process had its limitations and a minor but significant percentage of the shell molds produced were of inferior quality or resulted in inferior metal castings.

The drying equipment of U.S. Pat. No. 2,932,864 and U.S. Pat. No. 3,191,250 was capable of producing high quality shell molds at relatively high rates but the maximum rate of production was limited and the equipment was unsatisfactory for some shell molds having recessed areas or other areas which could not be dried effectively in the tunnels. The longitudinal flow of air in the tunnels often caused non-uniform or incomplete drying, and it was common practice to provide post drying of the completed shell molds for 24 hours or more to remove water that was not removed in the tunnels.

Over the years attempts have been made to improve the quality of the completed shell molds in many different ways. Formulations have been improved and the drying conditions have been varied but, prior to the present invention, the drying tunnels have continued to produce a substantial number of defective molds. Prior to this invention, in order to achieve adequate drying of the shell molds, dry-bulb temperatures have been used in connection with the air in the tunnels which are 30° or so higher than the pattern temperature, but the improved drying rates at higher temperature can be a disadvantage because of the damage which can be caused by overheating of the pattern. The present invention makes it possible to eliminate the vast majority of the mold defects which commonly occurred using the old drying system and to speed up the drying operation without causing damage by overheating of the pattern. The invention also makes it possible to obtain more effective and more uniform drying and substantially improved mold quality using lower dry-bulb temperatures. It also makes it possible to produce high quality shell molds without long post-drying procedures.

The apparatus of the present invention not only produces better shell molds but also makes it possible to achieve the same rate of production with smaller and less expensive air conditioning equipment. Also the equipment makes it easier to control the temperature and humidity of the air under all weather conditions and to maintain the high quality of the shell molds. The drying tunnels used prior to this invention were hard to control and tended to produce a much higher percentage of inferior or defective shell molds when weather conditions were unfavorable.

The process and apparatus of the present invention provide simple and effective solutions to the problems mentioned above and make it possible to produce shell molds of much higher and more uniform quality at much higher rates of production with smaller tunnels and smaller air conditioning equipment. The drying system retains basic features of the system disclosed in U.S. Pat. No. 3,191,250 including multiple drying tunnels with both legs of each tunnel opening to a dip-dust work room at one end and having a header or turn around area at the other end remote from the work room. The shell mold is formed as disclosed in that patent by repeatedly dipping the pattern in a refractory slurry, dusting the coated pattern with refractory particles, and placing the wet coated pattern in the drying tunnel to dry each coat before the next coat is applied by high velocity air moving longitudinally over the pattern. However, the drying procedure is changed by directing air laterally at high velocity against the coated pattern for a substantial period of time, such as 8 to 12 minutes, to effect more thorough drying.

The drying procedure must be such as to avoid overheating the pattern, and it is essential to avoid premature drying. Because it is necessary to employ dry-bulb temperatures above the wet-bulb temperature of the drying air and usually 10° to 20° or more above the pattern temperature in order to achieve a satisfactory rate of drying, it is a problem to avoid overheating the pattern, and the drying procedure must be carefully controlled to assure that the coated pattern is not dried too soon. It is the moisture in the pattern which prevents overheating, and premature drying can cause serious problems.

Surprisingly more thorough drying can be effected by high-velocity impact drying for 10 minutes or more without causing premature drying and overheating of the pattern even when the impact drying is followed by an additional 8 to 10 minutes of drying by longitudinal air flow. The impact drying by lateral air flow can be controlled to minimize drying of areas that are effectively dried by such longitudinal air flow so that the net result is more uniform drying rather than premature drying or overheating. It is, therefore, feasible to modify existing drying tunnel systems by adding impact drying at the headers or turn-around areas without changing the length of the tunnels or the overall drying times.

The apparatus of the present invention provides a new plant with much greater efficiency than the drying tunnels used prior to this invention. The improved equipment includes a large low-pressure plenum at one end of the tunnel legs adjacent the work room to reverse the air flow and prevent air from entering the work room and a header at the opposite end designed to direct all of the conditioned air upwardly and downwardly at high velocity against the patterns before that air moves through the tunnel legs. A lower duct carries the air from the low-pressure plenum to the header and means are provided for continually recirculating air through an air conditioning apparatus to maintain the desired temperature and humidity conditions.

An object of the invention is to minimize the number of defective shell molds produced when using a drying tunnel system of the type disclosed in U.S. Pat. No. 2,932,864.

Another object of the invention is to improve the quality of shell molds made by the aforesaid system.

A still further object of the invention is to provide more uniform drying of shell molds without causing premature drying or overheating of the patterns.

Other objects of the invention are to improve the efficiency of a drying tunnel system and reduce the amount of cooling equipment required to effect proper drying of a given number of shell molds.

Another object of the invention is to provide a drying tunnel system capable of handling a greater number of molds with equipment of a given size.

Another object of the invention is to provide simple economical drying tunnel equipment which is more reliable and easier to control under all weather conditions.

Another object of the invention is to provide drying equipment which can effectively handle many different types of shell molds, including those which could not be handled by the drying tunnels known prior to this invention.

Another object of the invention is to provide a simple, economical way to modify existing drying tunnel systems to improve their efficiency and to improve the quality of the shell molds.

Another object of the invention is to reduce unwanted drying of the shell molds in the work room.

These and other objects, uses and advantages of the invention will become apparent to those skilled in the art from the following drawings, description and claims.

Referring more particularly to the drawings, in which like parts are identified by the same numerals throughout the several views, FIGS. 1 to 6 show an improved drying apparatus A constructed according to the present invention having elements 2, 10, 11, 12, 14, 18, 25, 26, 28, 29, 35, 38, 40, 41, 43, 44, 49, 52-62, 63, 64, 66, 67, 68, 69, 72, 80, 82, 83, 91, 92, 93, 94 and 145 essentially corresponding to those of the drying apparatus disclosed in U.S. Pat. No. 3,191,250, the entire disclosure of which is incorporated herein by reference. The apparatus disclosed herein is an improvement in the apparatus of said patent and is used in a similar manner to carry out the process of said U.S. Pat. No. 2,932,864 in mass producing multi-layer shell molds.

The apparatus A of this invention comprises at least two U-shaped tunnels and preferably 4 to 10 parallel horizontal tunnels with an endless overhead conveyor to carry the coated wax patterns through all the legs of the tunnels at the same speed. All of the tunnels have incoming and outgoing legs which open at one end to one closed work room or working enclosure B having a door 2. The other ends of the legs are connected to headers 270 remote from the work room which direct air into the legs toward said room. The headers contain the U-shaped portions of the endless conveyor and provide the so-called "turn-around" areas. Preferably one header is provided for each tunnel but this is not essential.

The drawings show two tunnels 10 and 11 with four legs 25, 26 28 and 29 and two headers 270, but it will be understood that these can be duplicated to provide 6 to 10 or more tunnels as desired in connection with the endless conveyor 12 and that the temperature and humidity of each tunnel can be separately controlled if desired. For example, the apparatus can be constructed to carry out the preferred process of said U.S. Pat. No. 2,932,864 wherein the patterns are carried through all the tunnels at the same speed by an endless overhead conveyor 12 and the dry-bulb temperature of the drying air increases in accordance with the number of refractory layers applied to the pattern. Thus the dry-bulb temperature of the air in the last tunnel can be 20° to 30° above the wet-bulb temperature or the pattern temperature.

The dipping and dusting equipment used in the work room B may be identical with that disclosed in said U.S. Pat. No. 3,191,250 and may include a dip tank 18 adjacent the end of each outgoing leg of the tunnel system and a rotary dusting apparatus 35 adjacent the end of each incoming leg. one operator stands between the dip tank and the dusting apparatus and performs the necessary manual operations and inspections. If desired the dusting apparatus may be a fluidized bed similar to that disclosed in applicant's U.S. Pat. No. 3,307,232.

As herein shown, the dusting apparatus is as disclosed in said U.S. Pat. No. 2,932,864 and includes a drum 43 with buckets which drop the finely divided refractory material as the drum revolves. A suction fan 44 draws out the dust and discharges it through an exhaust conduit 49.

The conveyor 12 may be constructed the same as the endless overhead conveyor 12 of said U.S. Pat. No. 3,191,250 (see FIG. 6 of the patent) and may be provided with means to rotate the patterns or clusters 38 as they move through the tunnels, but such rotation is not essential. The means for suspending the patterns from the conveyor track or tube 52 is shown in FIG. 6 which illustrates the typical cross section of each tunnel leg.

The endless conveyor 12 comprises a hollow sheet metal tube 52 of uniform cross section with a longitudinal slot 53 in the bottom. Rollers 54 carried by shaft 56 ride on the inside of the tube at opposite sides of the slot. A stem 55 carried by the shaft supports a swivel joint 57 which carries the hook 58. When pattern rotation is desired, the joint 57 is provided with means to effect rotation including a rubber roller 59 which engages a rail or shoe 60 mounted on one side of the narrow channel at 61.

Figures 6, 7, 8, 9:
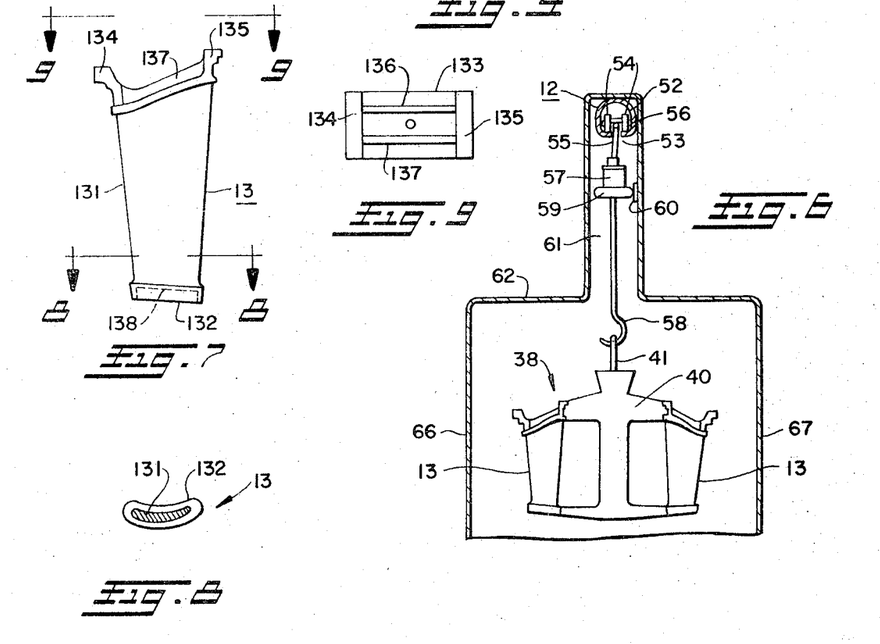
FIG. 6 is a fragmentary transverse vertical sectional view of one of the tunnel legs showing a pattern suspended on the conveyor.
FIG. 7 is a plan view showing one of the wax patterns.
FIG. 8 is a transverse sectional view taken on the line 8—8 of FIG. 7.
FIG. 9 is an end view looking in the direction of the arrows 9—9 of FIG. 7.

Each tunnel leg has a small cross-sectional area, such as 3 to 4 square feet, to facilitate longitudinal air flow over the patterns at a high velocity, such as 2,000 feet per minute, and preferably has a shape generally as shown in FIG. 6 with a narrow channel 61 to permit longitudinal movement of the hook 58 and a larger passage of rectangular cross section with an upper wall 62 and side walls 66 and 67 to permit longitudinal movement and/or rotation of the pattern or cluster 38.

Figures 1, 2, 3:
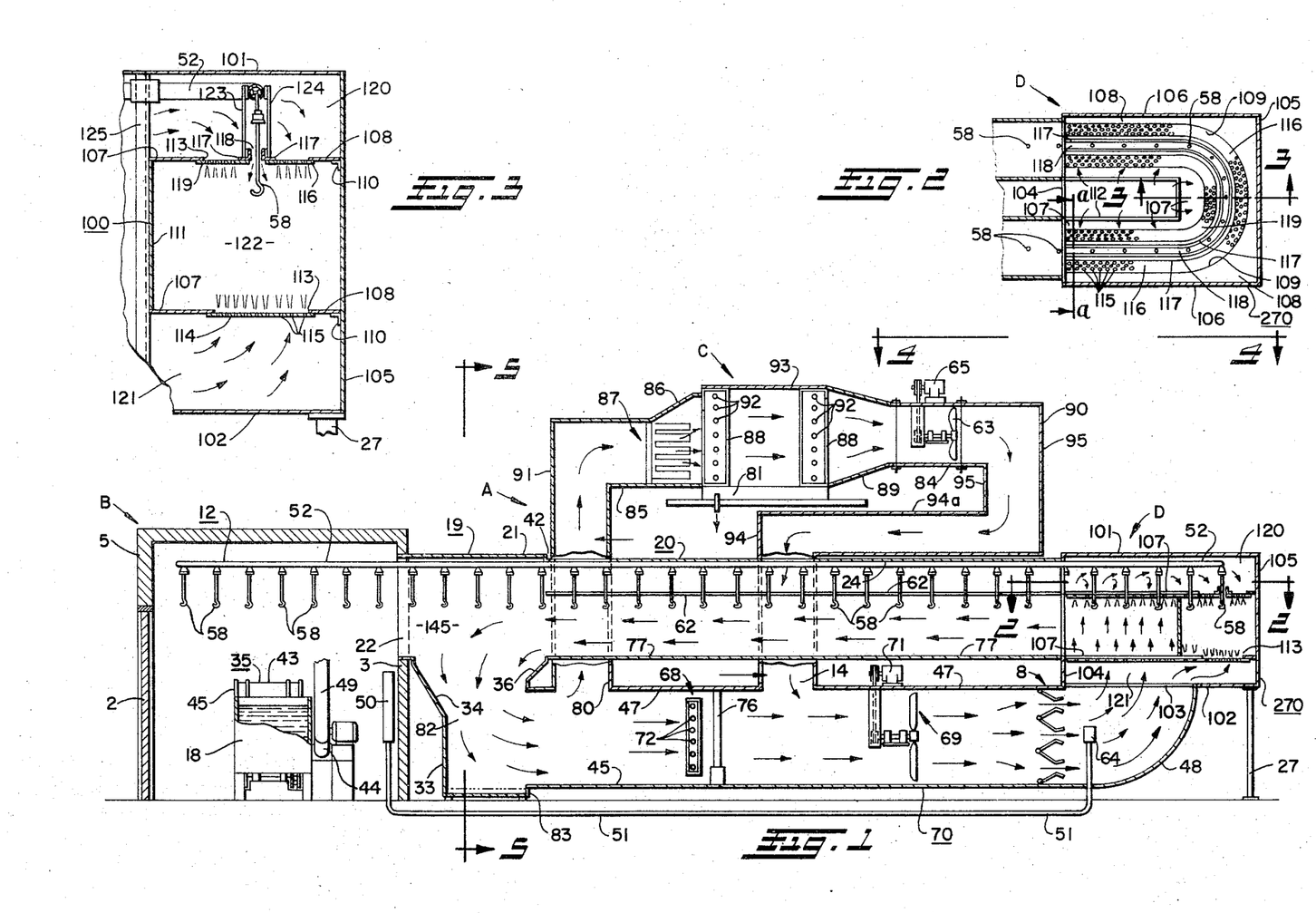
FIG. 1 is a longitudinal vertical sectional view on a reduced scale showing a drying tunnel apparatus constructed according to the present invention.
FIG. 2 is a fragmentary horizontal sectional view taken on the line 2—2 of FIG. 1.
FIG. 3 is a fragmentary vertical sectional view taken on the line 3—3 of FIG. 2 and on a larger scale.
Figure 4:
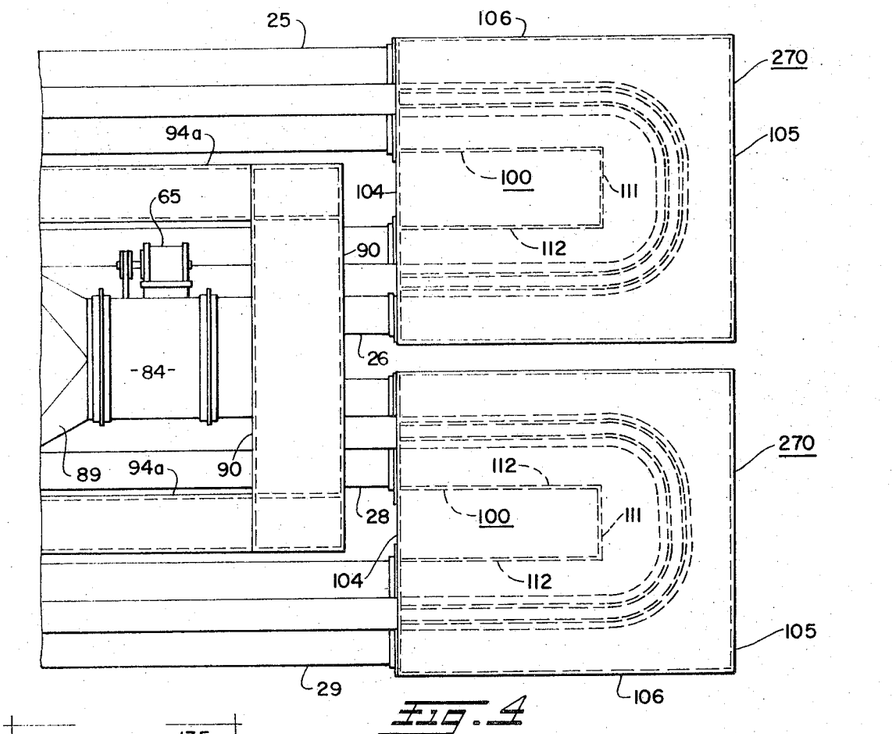
FIG. 4 is a fragmentary top view looking in the direction of the arrows at line 4—4 of FIG. 1.

The operation of the equipment of this invention will readily become apparent from FIG. 1 of the drawings. A comparison of this figure with FIG. 13 of said U.S. Pat. No. 3,191,250 will indicate the basic improvements provided by the present invention. It will be seen from said FIG. 1 that the patterns are conveyed through the tunnels by an overhead conveyor 12 identical to that of said patent and that the hooks 58 are carried from the hollow tube 52 of the endless conveyor and moved through the legs of the tunnels and through the work room in the same way. The tube 52 can be arranged to wind back and forth through the incoming and outgoing legs of the tunnels as disclosed in said patent.

The apparatus A of this invention is constructed to recirculate conditioned air through the tunnels without directing the air into the work room B and to control the air conditions in said room independently of the drying tunnels. Each drying tunnel is preferably the same as every other tunnel and has a long horizontal sheet metal conduit 20 of rectangular cross section enclosing the incoming and outgoing legs of that tunnel, a long horizontal sheet metal conduit 70 of rectangular cross section directly below and parallel to the conduit 20, and a rectangular sheet metal header 270 at the ends of the conduits directing the air from the conduit 20 to the tunnel legs. Each conduit 20 is perpendicular to the vertical side walls 3 and 5 of the room B and has an enlarged sheet metal housing 19 of rectangular cross section connected to the wall 3 and defining an opening 22 in the wall large enough to permit the conveyor to carry the patterns into and out of the room. If desired the opening 22 may be reduced in size to correspond to the cross section of the tunnel legs.

A vertical exhaust conduit 80 of rectangular cross section is connected to the top wall of each conduit 70 adjacent the housing 19 and extends upwardly between the two legs of the tunnel to a horizontal conduit 91 which extends laterally to the conduit 80 of the next adjacent tunnel. The conduits 90 and 91 may be connected to more than 2 tunnels if a single air conditioning unit C is used with a series of tunnels (for example, 4 to 8 tunnels).

A vertical return conduit 94 of rectangular cross section is connected to the top wall of each conduit 70 a substantial distance downstream of conduit 80 and extends upwardly from its discharge opening 14 to a horizontal conduit 94a located a short distance above and parallel to conduit 20. The inlet end of conduit 94a is connected a short vertical conduit 95 of rectangular cross section which extends upwardly to a horizontal connecting conduit 90, similar to conduit 91, which extends laterally to the conduit 95 of the next adjacent tunnel.

One air conditioning unit C is provided between each pair of lateral conduits 90 and 91 to conduct the air as indicated by the arrows in FIG. 1. One unit C can be used to provide all of the cooling for 2 to 10 tunnels, but it is usually preferable to provide one such unit for every 2 to 4 tunnels. For example, each pair of U-shaped tunnels may have one air conditioning unit C arranged as illustrated in connection with tunnels 10 and 11.

As herein shown, a horizontal conduit of rectangular cross section extends longitudinally between the central portions of the lateral conduits 90 and 91 and has an inlet portion 85 at conduit 91, a tapered portion 86, an enlarged main central conduit 93, a tapered portion 89, and an outlet portion 84 at conduit 90. All of the air from portion 85 flows through the filter 87 at section 86 and then through the two cooler-condensers 88 in conduit 93. The chilled water cooling coils 92 of the units 88 condense the water in the moisture-laden air which is caught in the condensate pan 81 and drained off. A blower 63 is provided in conduit portion 84 to cause the desired circulation of air through conduits 80, 91, 93, 90, 95 and 94 and a blower 69 is provided in conduit 70 to provide the desired circulation in ducts 20 and 70 as indicated in FIG. 1. The moisture-laden air from a plurality of tunnels is continually drawn through the conduits 80 to the unit C, and the air is returned to the tunnels through conduits 94 after the excess moisture has been removed by the condensers 88. The rate of flow through the unit C depends on the size and speed of the blower 63 and its motor 65, which are preselected to permit the desired control of temperature and humidity in conduit 70. The rate of air flow in the tunnels depends on the size and speed of the blower 69 and its motor 71, which are preferably preselected to provide longitudinal flow in the tunnel legs at a speed of at least 1,500 and preferably about 2,000 to about 2,500 feet per minute.

The temperatures and humidities employed in the different drying tunnels may be the same as disclosed in said U.S. Pat. No. 3,191,250, and the wet-bulb temperature may be substantially the same in all tunnels and substantially equal to the pattern temperature while the dry-bulb temperature is increased in accordance with the number of refractory coats or layers applied to the wax pattern. Thus the apparatus or process may be arranged to effect drying of the first and second layers with air at a relative humidity of 50 to 60 percent, the third and fourth layers with air at a relative humidity of 45 to 55 percent, the fifth and sixth coats with air at a relative humidity of 35 to 45 percent and subsequent coats with air at a relative humidity below 30 percent.

Figure 5:
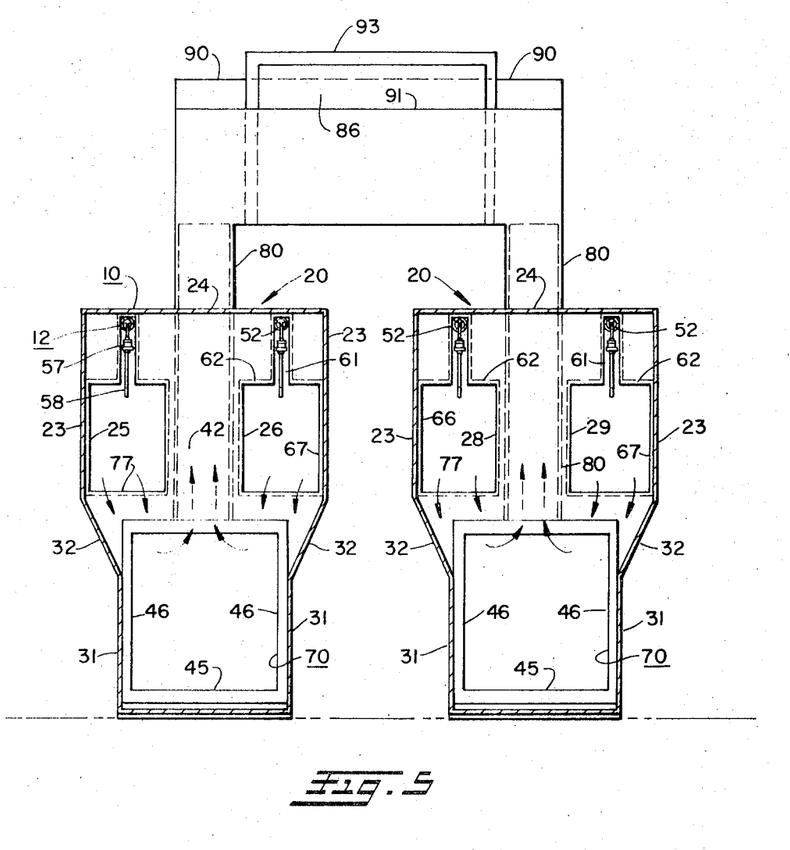
FIG. 5 is a transverse vertical sectional view taken on the line 5—5 of FIG. 1 and on a larger scale with parts omitted.

The apparatus of the present invention may comprise 4 to 10 or more tunnels constructed generally as indicated in FIGS. 1 to 6 in connection with one work room B. As illustrated each tunnel has two parallel legs with a generally rectangular front housing 19 at the ends of the legs adjacent the work room. The housing 19 has a flat horizontal top wall 21 somewhat lower than the top wall or ceiling 4 of the work room and extending between the vertical side walls 23 and duct 20 and has side walls 31 extending down from the duct 20 to the water pan 83 with portions 32 inclined inwardly from the upper duct 20 to the lower duct 70. The housing 19 also has a flat vertical front wall 33, a flat inclined front wall portion 34 extending from wall 33 to the opening 22, a flat vertical rear wall 42 at the end of top wall 21, and a flat inclined wall portion 36 extending down from the wall 42 and the bottom walls 77 of the tunnel legs. The wall 42 closes the space between the tunnel legs as shown in FIG. 5. The walls of the housing are shaped to facilitate downward flow of the air from the large chamber 145 of the housing 19 to the low-pressure plenum 82 at the lower part of the housing. The large rectangular air chamber 145 at the discharge end of the tunnel legs decelerates the air flow, and the deflecting means at 34 deflects the air into the low-pressure plenum 82, whereby all of the air from the tunnel legs is caused to turn around, reverse direction and flow into lower duct 70 without passing through opening 22 to the work room B. The inclined walls 34 and 36 provide streamlined flow and reduce turbulence while assuring proper flow of the air into plenum 82 and proper dust removal to pan 83. The shape of the housing 19 is critical to enable it to function in this manner, and it will be understood that satisfactory results are obtained when the housing is constructed substantially as shown in the drawings, which are drawn substantially to scale.

As indicated in FIG. 5, each tunnel is of sheet metal construction and has a main conduit 20 of rectangular cross section located directly above a lower conduit 70 of somewhat smaller rectangular cross section. The main conduit has a flat horizontal top wall 24 extending between a pair of flat vertical side walls 23. The lower conduit 70 has flat horizontal bottom and top walls 45 and 47 extending between flat vertical side walls 46 and has a curved end wall 48 directing air upwardly through the opening 103 of the header 270. The conduits 20 and 70 extend from the housing 19 to the header 270 to provide a closed air circulation system with part of the moisture-laden air continuously drawn off through conduits 80 to the air conditioning means C and recirculated after the excess water has been removed.

The two legs of each tunnel may be identical to the legs of the tunnels disclosed in said U.S. Pat. No. 3,191,250. Each tunnel leg has a flat horizontal upper wall 62, which is split and separated to provide the narrow space 61 for movement of the hooks 58, a pair of flat vertical side walls 66 and 67, and a flat horizontal bottom wall 77. The incoming leg may be spaced from the outgoing leg to provide room for the vertical ducts 80 and 94 (see FIGS. 4 and 5). Each leg has a small cross sectional area to provide a high velocity air flow, and such area is preferably from about 3 to about 4 square feet or such as to provide a longitudinal air velocity in each tunnel leg of at least 1,500 and preferably 2,000 to 2,500 feet per minute. The speed of the conveyor and the length of the tunnel legs may be varied considerably, but the legs are long enough to provide a drying time in each leg of at least 4 minutes and preferably about 5 to about 10 minutes.

The humidity of the air discharged from each duct 70 to its associated header 270 may be controlled using a sensing element 64, an air conditioning unit 68 and a humidifier 76 of the general type disclosed in U.S. Pat. No. 3,191,250. As shown diagrammatically in FIG. 1, the apparatus A of this invention has a unit 68 with a conventional hot-water heating coil 72 located upstream of the opening 14 in top wall 47 and has a conventional humidifier 76 a short distance downstream of said coil to add steam or moisture to the air as required. A blower 69 is located in the duct 70 downstream of opening 14 and driven by an electric motor 71. Pincer-type dampers 8 may be provided downstream of the blower to regulate the air flow.

Conventional regulating means may be provided to measure the wet-bulb and dry-bulb temperatures and to control the humidifier 76 and the hot-water heating coil to maintain the desired conditions. As herein shown, a conventional sensing element 64 is provided in the duct 70 of each tunnel a short distance from the central portion of damper unit 8 and is operably connected to units 68 and 76 of that tunnel and to a control box 50 located in the dip-dust room b. A metal conduit 51 may be provided to cover the necessary wiring or thermal capillary tubes.

The unit 64 measures the wet-bulb and dry-bulb temperatures of the air, which are indicated at the box 50. The hot-water coil 72 adds heat as directed by the dry-bulb temperature controller at 64 to maintain a constant dry-bulb temperature which may be preselected at box 50. The humidifier 76 adds moisture to the air as directed by the wet-bulb temperature controller at 64 to maintain a constant wet-bulb temperature, which may also be preselected or adjusted at box 50. The wet-bulb temperature of the air entering header 270 is maintained substantially equal to the pattern temperature (for example, room temperature or 75°F.) and the dry-bulb temperature is usually maintained 10 to 20 degrees above the wet-bulb temperature to effect drying at a suitable rate. It will be noted that, unlike the prior art structures, the wet-bulb and dry-bulb temperatures of the air leaving duct 70 are independent of the conditions in the dip-dust room.

In accordance with the present invention the headers 270 are constructed to provide high-velocity impact drying. As herein shown, each header 270 is generally rectangular and has a flat horizontal rectangular top wall 101 and a flat bottom wall 102 of rectangular perimeter parallel to wall 101 and having a rectangular opening 103 to receive air from duct 70. Vertical posts 27 may be provided to support the header 270. The header has a flat vertical inner end wall 104 of rectangular perimeter, a flat rectangular outer end wall 105 parallel thereto and perpendicular to walls 101 and 102, and a pair of flat rectangular side walls 106 perpendicular to walls 105 and 102.

The header 270 is subdivided by horizontal plates to form closed upper and lower chambers 120 and 121 and a vertical duct 100 of rectangular cross section extending therebetween to conduct air to the upper chamber. The duct 100 has a flat vertical plate 111 forming the outer end wall and flat vertical plates 112 forming side walls parallel to the header side walls 106, the header wall 104 forming the other end of the duct. The plate 111 is rigidly connected to 2 or more narrow vertical supporting bars 125 which extend the full height of the header and are rigidly connected to the guide tube 52.

As shown in FIGS. 2 and 3, flat inner and outer horizontal plates 107 and 108 are rigidly mounted on the header 270 by angle brackets 110 or other suitable means in horizontal planes containing the upper and lower walls 62 and 77, respectively, of the tunnel legs. The plates 107 and 108 are spaced apart to provide a wide U-shaped slot or opening 113 of uniform width in vertical alignment with the U-shaped portion of the conveyor tube 52 and following the path of movement of the coated patterns through the headers. Thus the outer plate 108 has an arcuate edge 109 concentric to the arcuate portion of tube 52 and the arcuate edge of plate 107 as illustrated in FIG. 2. The construction of plates 107 and 108 is the same at the top and bottom of plate 111 and both slots 113 are the same, but the hooks 58 move through the upper slot 113 only which must be provided with a permanent opening, such as slot 118.

The bottom slot 113 is covered by a flat U-shaped perforated lower metal plate 114 which has the same shape as the slot 113 but is somewhat wider as shown in FIG. 3. The marginal portions of the plate 114 extend below the lower plates 107 and 108 as shown in FIG. 3 and are welded to or otherwise rigidly connected to said plates so that all of the air moving upwardly from chamber 121 passes through duct 100 or the perforations 115 of plate 114.

A special perforated-plate assembly is required to cover the upper slot 113 because of the need for a narrow slot to permit movement of the hooks 58. As shown in FIGS. 2 and 3, such assembly includes a pair of flat U-shaped metal plates 116 and 119 and a pair of U-shaped metal angles 117 rigidly mounted thereon and spaced apart to provide a U-shaped slot 118 of uniform width vertically aligned with the U-shaped part of the conveyor tube 52. The slot 118 is less than one inch wide and narrow enough to permit the pressure drop between chambers 120 and 122 necessary to provide the desired air velocity at the discharge of openings 115. The width of slot 118 may be one-half to three-quarter inch and is sufficient to permit movement of the hooks 58 through the header.

A series of spaced vertical straps or supports 123 and 124 are rigidly connected to the tube 52 and to the angles 117 and assist in supporting the perforated plates 116 and 119 in the same horizontal plane. The latter plates are rigidly connected to the plates 107 and 108 like the plate 114 and function in the same way except that the air jets from the perforations 115 are directed down instead of up. As herein shown the innermost edge of plate 119 and the outermost edge of plate 116 are vertically aligned with the inner and outer U-shaped edges of the plate 114.

The construction will be apparent from FIGS. 1, 2 and 3, it being understood that a lateral section taken at line a—a of FIG. 2 or any other lateral section along the path of travel of the patterns in header 270 is essentially the same as the section taken at line 3—3 of that figure (see FIG. 3), except for the hooks 58 and the supports 123 and 124.

The front wall 104 of the header and the other enclosing walls of the chambers 120 and 121 seals those chambers to that all of the air from duct 70 must move through the slot 118 and the perforations 115 of plates 114, 116 and 119 before it enters the U-shaped impact drying chamber 122 of the header 270 and before it moves from the latter chamber to the tunnel legs.

As indicated in FIG. 2, the holes or perforations 115 of the plates 114, 116 and 119 are closely spaced and regularly arranged in parallel rows and extend the full width and length of the plates so that a pattern or cluster moving through the drying chamber 122 is continuously engaged by vertical air jets throughout its movement in header 270. Each hole or perforation 115 may be circular or cylindrical or shaped to provide a nozzle for directing a jet of air upwardly or downwardly (preferably vertically) against a cluster or pattern moving through the drying chamber 122. The diameter of each hole 115 is preferably no more than one inch or so and small enough to provide the desired velocity to the air jet (i.e., a diameter of 0.2 to 1.0 inch). The center of each hole 115 may be spaced from the center of each adjacent hole 115 a short distance, such as 0.5 inch to 4 inches, and such distance is preferably uniform and preferably no more than 2 inches, but many different arrangements of the holes are suitable. If desired the total air flow through slot 118 and plates 116 and 119 may be substantially the same as that that through the holes of the plate 114 so that the amount of air directed downwardly to the drying chamber 122 from upper chamber 120 is about the same as the amount directed upwardly to said drying chamber from lower chamber 121. Also the amount of air discharged from each of the chambers 120 and 121 may be controlled by restricting or regulating the flow through duct 100, but this is usually not important.

It will be seen from the drawings that all of the air from each duct 70 which moves through the header 270 to the two legs of the tunnel is forced through the slot 118 and the holes 115 to provide impact drying. The air discharged from said slot and each of said holes has a vertical velocity of at least 1,000 and preferably at least 1,500 feet per minute, and the total amount of air so discharged must be sufficient to provide a longitudinal velocity of at least 1,000 and preferably at least 1,500 feet per minute in each tunnel leg. Ordinarily this means a total flow of several thousand cubic feet per minute. It will be understood, therefore, that a large number of openings 115 are necessary. The number of openings 115 in each of the plates 114, 116 and 119 is preferably 100 or more per square foot and may be 200 to 600 or more per square foot.

In the apparatus illustrated herein, the blowers are of a size to provide a longitudinal air velocity in each tunnel leg of 1,500 to 1,600 feet per minute when the tunnel is empty, all of the air being forced through the openings 115 as described above. When a typical pattern or cluster is conveyed through the tunnel leg, such as the pattern illustrated in FIG. 6, the longitudinal velocity of the air passing over the pattern is in the neighborhood of 2,000 feet per minute. In the practice of this invention, the latter air velocity is preferably maintained in the range of from about 1,500 to about 2,500 feet per minute.

In the apparatus illustrated herein, all of the openings 115 are of the same size and shape which are such as to provide vertical air jets which move against the coated patterns being dried at a velocity of about 2,000 feet per minute. In the practice of this invention, such velocity is preferably maintained in the range of about 1,500 to about 2,500 feet per minute and the air jets are preferably directed upwardly or downwardly at an angle of at least 50° and usually 80° to 90° relative to the horizontal. It will be understood, however, that advantages of the invention can also be obtained by impact drying using air jets directed transversely of the path of movement of the patterns against the sides of the patterns.

In the apparatus illustrated herein, the patterns are suspended on the hooks 58 and conveyed through the tunnel legs at a relatively slow speed, such as 2 feet per minute, with or without rotation of the patterns by rollers 59. Each pattern moves about 16 feet through esch tunnel leg and about 12 feet through the header 270 as it moves from the inlet end of slot 118 to the outlet end so that the pattern is dried for about 8 minutes in the incoming tunnel leg, for about 6 minutes in the impact drying zone of the header, and for about 8 minutes in the outgoing tunnel leg. It will be understood, however, that pattern movement is not needed when carrying out the process of this invention. Thus both the drying by longitudinal air flow and the impact drying can be carried out while the patterns are stationary. Special drying apparatus can be provided to do this, for example, when the pattern is too large to move through the tunnels.

Stationary drying can also be accomplished using the tunnels shown herein. For example, a pattern could be placed in one of the tunnel legs 25 or 26 and dried for 10 to 15 minutes while held stationary and then be placed in the header 270 and subjected to impact drying for 8 minutes while held stationary. The movement to each position could be effected manually or also by manual control of the conveyor 12. It will be apparent that the process of this invention can be practiced in many different ways, but it is preferable to employ drying tunnels with an endless conveyor to facilitate mass production.

In carrying out the process of this invention the patterns should usually be dried by high velocity longitudinal air flow (for example, in the tunnel legs) for a total of at least about 10 minutes (except perhaps for the first two coats applied to the pattern) and should be subjected to impact drying for at least 5 and usually 6 to 12 minutes. The total drying time for each pattern in the tunnel legs usually should not exceed 25 minutes and is preferably 10 to 15 minutes for most patterns. The total time for each pattern in the impact drier usually should not exceed 15 minutes and is preferably 8 to 12 minutes for most patterns. The apparatus of this invention can reduce the overall drying time for typical patterns to 15 minutes or less for every layer of the shell mold, for example, by providing impact drying for 6 minutes and drying in each tunnel leg for 4 to 5 minutes.

The best drying time will depend on the size and shape of the particular pattern or cluster. Also the ideal drying time will be different for different layers of the shell mold and will change as the humidity of the air is reduced to facilitate removal of larger amounts of water. The amount of water picked up when the coated pattern is dipped in the ceramic slurry (at dip tank 18) increases as more layers are built up. For example, the amount of water picked up in the first dip may be less than one-fifth the amount of water picked up in the fifth dip after 4 layers have been applied to the pattern.

The exact drying time which is best for every layer cannot be achieved in the apparatus illustrated because all the tunnels are of the same length and the conveyor speed at each tunnel is the same. However, by controlling the humidity of the air in each tunnel separately, it is possible to obtain excellent results in spite of these limitations.

Shell molds of the highest quality are produced by the process of this invention when each layer of the shell mold is thoroughly dried before the next layer is applied, for example, by removing at least 80 percent of the moisture after each dip in the ceramic slurry. The process should be carried out so that at least 80 percent and preferably at least 85 percent of the water picked up from the slurry by the coated pattern during application of each of the first 3 layers is removed in the drying tunnel before the next layer is applied and so that at least 75 percent and preferably at least 80 percent of such water picked up during application of each of the subsequent series of layers is removed before the next layer is applied.

For example, a typical pattern can pick up about 0.1 to 0.15 ounces of water per square foot of surface during application of the first layer, about 0.4 to 0.5 ounces of water per square foot for the second layer, about 0.7 to 0.8 ounces per square foot for the third layer, 0.9 to 1.0 ounces per square foot for each of the next 3 layers, and about 1.1 to 1.2 ounces per square foot for the seventh layer. If this pattern is used to make a multi-layer shell mold using a 7-tunnel drying apparatus of the type disclosed herein with air having a wet-bulb temperature of about 75°F., the dry-bulb temperatures can, for example, be 80° to 85°F. in the first tunnel, 85° to 88°F. in the second tunnel, 88° to 92°F. in the third and fourth tunnels, 93° to 96°F. in the fifth and sixth tunnels, and 98° to 100°F. in the seventh tunnel.

As an example, when making such multi-layer shell mold, 95 percent or more of the water picked up from the slurry during application of each of the first and second layers is removed in the first two tunnels of the apparatus A, 85 to 90 percent of such water is removed in the third tunnel for the third layer, 80 to 85 percent of such water is removed for the fourth, fifth and sixth layers, and 75 to 80 percent or more is removed in the seventh tunnel for the seventh layer. The dry-bulb temperature of the drying air used to dry the last coat can be as much as 30° Fahrenheit above the wet-bulb temperature but better molds are produced if such dry-bulb temperature is no more than 20° above the wet-bulb temperature or if the relative humidity is about 30 to 35 percent because there is less tendency to overheat the pattern.

Prior to this invention it was customary to dry the last layer of the shell mold in the drying tunnels using air having a relative humidity of around 25 percent and a dry-bulb temperature 30° or so above the wet-bulb temperature. Thereafter the mold was post-dried for 24 hours or so in an atmosphere having a relative humidity of about 10 to 20 percent. Such a long post drying period was necessary for almost all shell molds to make them stable enough for further processing.

In the prior art tunnel systems as disclosed in said U.S. Pat. No. 3,191,250, it was considered essential to limit the amount of water removed from the last layer (for example, to no more than 70 to 75 percent) because the drying times for the shell molds vary substantially and the vast majority of the patterns have a shape such that the shell molds are not dried uniformly. Thus before the mold is entirely dry, some portions will dry prematurely and can cause overheating of portions of the pattern and damage to the mold.

The present invention provides substantially uniform drying even when the patterns or clusters have intricate shapes and, therefore, premature drying is less of a problem and it becomes practical to remove 80 to 85 percent or more of the moisture when drying the last layer of the shell mold. Also the uniform drying substantially reduces the time required for post-drying. The present invention makes it possible to eliminate post drying for many shell molds. Usually the time required for post drying shell molds made by the process of this invention is no more than about one-third the time previously required when using the prior art methods. In most cases molds of the highest quality are produced by the process of this invention even when the post-drying time at 20 percent relative humidity is reduced to 4 to 8 hours.

FIGS. 6 to 9 show a wax pattern 13 of a type commonly used in making shell molds for making precision metal parts such as turbine or compressor blades. This general type of pattern produces a shell mold having an intricate shape with recessed areas which cannot be dried properly in a conventional drying tunnel. Ordinarily several of such wax patterns 13 are mounted to provide a cluster 38 of the type disclosed in said U.S. Pat. No. 3,191,250 including a conventional wax sprue 40 and a handle or eye 41 to receive the conveyor hook 58 as shown in FIG. 6. The handle 41 may also be used for manual support of the cluster during the dipping and dusting operations at units 18 and 35. The coatings on the cluster constituting the layers of the shell mold are omitted in FIG. 6 to facillitate a clear illustration of the wax cluster.

As herein shown, each wax pattern 13 of the cluster 38 has a main blade portion 131 of conventional streamlined cross section with enlarged end portions 132 and 133. The opposing parts 134 and 135 of the portion 133 are connected by narrow reinforcing ribs 135 and 137 which tend to interfere with the flow of drying air over the coated pattern. The recess 138 of the other end portion 132 also creates a drying problem.

When the cluster 38 is dried in a conventional drying tunnel as disclosed in said U.S. Pat. No. 3,191,250 the main blade portion of the shell mold at 131 can be completely dried when the recessed areas of end portions 132 and 133 are still wet. Therefore there is a danger that the premature drying will cause overheating of blade portion 131 of the pattern and damage to the mold from expansion of the wax.

The process of the present invention effectively dries the recessed areas in the impact drying section 270, and damge to the mold is easily avoided by operating the equipment so that the maximum temperature achieved by any part of the wax pattern during its travel through the tunnel is no more than 8 degrees Fahrenheit above the wet-bulb temperature of the drying air. However, such maximum can sometimes be allowed to go as high as 10° or somewhat higher after five or six layers have been applied to provide the mold with substantial strength.

The high velocity air in each tunnel leg tends to cause the cluster 38 to turn with the hook 58 as the cluster moves through the tunnel. The roller 59 and rail 60 (see FIG. 6) are unnecessary and are usually omitted.

The apparatus shown in the drawings is relatively large and may require an air flow in each tunnel of 12,000 cubic feet per minute or more. Impact drying by air jets transverse to that flow would be very inefficient, and therefore, such air jets are not employed in the tunnel legs. In spite of the flow problems when handling such large volumes of air, it is practical to cause all of the air to mov through the relatively small openings 115 in the impact drier. For example, in the equipment shown in the drawings satisfactory results may be obtained using one-quarter inch circular holes in a 16-gauge metal sheet with center-to-center distances of one-half inch to provide about a 23 percent open area.

The large air flows indicated above are similar to those provided in conventional equipment of the type disclosed in U.S. Pat. No. 3,191,250. However, the equipment of the present invention makes it possible to dry many more molds in a given period of time with air conditioning equipment of a given size. This does not require an increase in the conveyor speed because the patterns may be placed closer together on the conveyor. The present invention makes it possible to achieve the same or a higher rate of production as the prior art drying apparatus with much smaller drying tunnels.

The present invention represents a giant step forward in the art of making shell molds not only because of the high drying capacity but also because of the great improvement in mold quality and in the yield of top quality molds. It is believed that the invention will eliminate the vast majority and perhaps 75 to 90 percent of serious mold defects due to improper drying and will reduce the number of defective shell molds and defective castings at least 25 and perhaps 30 to 40 percent or better. For example, where the prior art drying tunnels produced over 5 percent of defective shell molds when using a particular pattern, the drying apparatus of the present invention could reduce the number of defective molds more than 25 percent using the same pattern while at the same time significantly improving the quality of the average mold produced. In many cases the apparatus of this invention would permit efficient mass production of some intricate shell molds or clusters could not even be made using the prior art drying tunnels.

In the practice of this invention, superior shell molds are produced by maintaining the air in the dip-dust room B at a dry-bulb temperature of 70° to 80°F. and at a relative humidity of about 60 to about 80 percent or higher. Any temperature or humidity may be employed in said dip-dust room without interfering with operation of the tunnel system. Prior to this invention, the apparatus required that the relative humidity in the dip-dust room B be no more than about 50 percent, and higher humidites were not used. The present invention improves the quality of the shell molds by reducing undesirable drying in the dip-dust room and also gives the operator more time for quality inspections and the like.

It will be understood that variations and modifications of the specific processes and devices disclosed herein may be made without departing from the spirit of the invention.

Having described our invention, we claim:

1. A process for forming and drying layers of refractory material over destructible patterns to form shell molds comprising providing a plurality of drying tunnels, each having a narrow passage of small cross-sectional area to permit longitudinal movement of the patterns and to facilitate rapid flow of air over the patterns, providing an air-conditioned work room at the open ends of said tunnels having an atmosphere independent of said tunnels, forcing air through said tunnels at a velocity of at least 1,000 feet per minute, repeatedly coating each pattern in the work room by dipping it into a slurry of refractory material and dusting it with refractory particles, repeatedly drying each coated pattern by conveying it through one of said tunnels for at least several minutes and by directing a large number of air jets laterally against the coated pattern at a velocity of at least 1,000 feet per minute in an impact drying zone, and controlling the temperature and humidity of the air supplied to said jets and to said tunnels to maintain predetermined wet-bulb and dry-bulb temperatures, the wet-bulb temperature being maintained about equal to the pattern temperature and at least 10° below the dry-bulb temperature.

2. A process according to claim 1 wherein said jets of air are directed against upper and lower portions of each pattern in an impact drying area and each pattern is gradually moved through said area in a period of time from about 6 to about 12 minutes.

3. A process according to claim 2 wherein each pattern is held in an upright position as it moves through the drying tunnels and has recessed areas which are not exposed directly to the high velocity air moving longitudinally through the tunnels and wherein said air jets are directed against said recessed areas while the pattern is in said impact drying area to remove surface water so that substantially all surface water and part of the absorbed-water is evaporated from the coated pattern before it is discharged from the outgoing leg of the tunnel to the work room.

4. A process according to claim 1 wherein each tunnel has 2 legs and an impact drying zone between said legs and the air supplied to each leg is directed transversely at a velocity of at least 1,500 feet per minute against the patterns moving through said impact drying zone and is then directed longitudinally through said leg at a velocity of at least 1,500 feet per minute.

5. A process according to claim 4 wherein each pattern is dried in each leg for 5 to 8 minutes and is dried in said impact drying zone for 6 to 12 minutes.

6. A process according to claim 1 wherein each pattern has at least six layers of refractory material applied thereto to form a shell mold and is thereafter dipped in a refractory slurry, dried in each leg of a drying tunnel for at least 4 minutes by air moving longitudinally at a velocity of at least 1,500 feet per minute and dried in said impact drying zone for at least 6 minutes by air moving laterally against the pattern at a velocity of at least 1,500 feet per minute, the total drying time being no more than 15 minutes and sufficient to remove at least 75 percent of the moisture from the shell mold, the drying air used in said tunnel having a dry-bulb temperature no more than 20° above the wet-bulb temperature.

7. In a process for forming and drying layers of refractory material over destructible patterns to form shell molds comprising providing at least one drying tunnel having a reduced cross-sectional size to facilitate rapid flow of air over the patterns, repeatedly coating each pattern by dipping it into a slurry of refractory material, repeatedly drying each coated pattern in the tunnel by forcing air through the tunnel and longitudinally over the pattern at a velocity of at least 1,000 feet per minute, and controlling the temperature and humidity of the air supplied to each tunnel, the improvement which comprises directing air upwardly and downwardly against the bottom and top surfaces of the patterns at a velocity of at least 1,500 feet per minute to effect impact drying of portions of the pattern which are shielded from the longitudinal air flow, and controlling the temperature and humidity of the air supplied to said jets to maintain a predetermined wet-bulb temperature about equal to the pattern temperature and a predetermined dry-bulb temperature at least 10° above the dry-bulb temperature.

8. A process according to claim 7 wherein each pattern is subjected to impact drying for about 8 to about 12 minutes in the tunnel before being removed from the tunnel.

9. A process according to claim 7 wherein all of the air supplied to said jets is caused to move longitudinally in the tunnel at a velocity of at least 2,000 feet per minute.

10. A process according to claim 9 wherein the patterns are moved longitudinally in the tunnel.

11. A process according to claim 10 wherein each tunnel is generally U-shaped with an incoming leg and an outgoing leg and a header to permit the patterns to reverse directions as they are moved from one leg to the other and wherein a large number of air jets are directed transversely against the patterns during their movement through the header and all of the air from said jets is caused to move longitudinally through the two legs of the tunnel at a velocity of at least 1,500 feet per minute.

12. A process according to claim 7 wherein each pattern is dried for about 3 to about 8 minutes by passing air longitudinally over the pattern at a velocity of 1,500 to 2,500 feet per minute.

13. A process according to claim 7 wherein each pattern has at least six layers of refractory material applied thereto and at least 80 percent of the moisture is removed in the drying tunnel after each dip in the refractory slurry before the next coat is applied.

14. Apparatus for forming and drying layers of refractory material over destructible patterns to form shell molds comprising a plurality of U-shaped drying tunnels, each being connected to a narrow longitudinal incoming leg and a narrow longitudinal outgoing leg, each of said legs having a passage of small cross-sectional area to permit longitudinal movement of the patterns and to facilitate rapid flow of air over the patterns, the longitudinal legs of said tunnels being open at one end of said apparatus, enclosure means at said one end defining a dip-dust work room and receiving the open ends of said legs, endless conveyor means extending through the legs of said tunnels to carry the coated patterns through said legs into and out of said work room, said conveyor means being arranged to move the patterns in one direction through the incoming legs of the tunnels and in the opposite direction through the outgoing legs, a dip tank and a refractory dusting means in said work room associated with each drying tunnel, each dusting means containing refractory particles and having means for continually imparting motion to said particles, whereby a large number of shell molds can be mass produced in said room by dipping the patterns in ceramic slurry, dusting the patterns at the dusting means and placing the coating patterns on the conveyor for drying in said tunnels, means for forcing air through both legs of each tunnel toward said dip-dust room at a velocity in excess of 1,000 feet per minute including a lower duct below the tunnel legs having a large low-pressure plenum at one end near said dip-dust room and a header at its opposite end in communication with the tunnel legs at the ends thereof remote from said room, air conditioning means responsive to the temperature and moisture content of the air for controlling the temperature and humidity of the air entering said header to maintain the wet-bulb and dry-bulb temperatures of the air at predetermined values, an exhaust dust connected to said lower duct to remove moisture-laden air from said lower duct, cooling means associated with said exhaust duct for condensing and removing moisture from said air, a returnduct for returning said air from said exhaust duct to said lower duct, blower means for moving air from said plenum through said exhaust duct and said return duct and for moving the air through the header and the tunnel legs, and impact drying means in said header for directing high-velocity jets of air laterally against the patterns as they move through the header to effect drying of recessed areas of the patterns.

15. Apparatus according to claim 14 wherein said cooling means is located in a large duct receiving moisture-laden air from at least 4 legs of the tunnels, and means are provided for returning the drier air from said cooling means to said last-named legs.

16. Apparatus according to claim 15 wherein said last-named means comprises a lower longitudinal duct below the two legs of each tunnel and each tunnel has a header separate from the header of each other tunnel.

17. Apparatus according to claim 14 wherein at least one of said tunnels has legs with an open cross-sectional area from about 3 to about 4 square feet and the low-pressure plenum is shaped to provide means for drawing essentially all of the air from said legs while reducing turbulence to prevent such air from entering the work room.

18. Apparatus according to claim 17 wherein the return duct is independent of said work room and all of the air from said cooling means is carried directly to said lower duct.

19. Apparatus according to claim 14 wherein means are provided for forcing the air through said legs at a velocity of about 1,500 to about 2,500 feet per minute.

20. Apparatus according to claim 19 wherein one lower duct and one header are associated with each tunnel, each header having means for directing jets of air against the top and bottom of each pattern at a velocity of at least 1,500 feet per minute.

21. Apparatus according to claim 14 wherein the low-pressure plenum is shaped to provide means for drawing essentially all of the air from the legs of the tunnel when the velocity in said tunnels is in excess of 1,500 feet per minute, said means including inclined wall means that converge in a downwardly direction and are shaped to provide generally streamlined flow with minimum turbulence.

22. Apparatus according to claim 14 wherein from 2 to 10 of said U-shaped drying tunnels extend outwardly from said work room, and endless overhead conveyor is provided to carry the patterns through all the legs of the tunnels at substantially the same speed, and wherein each tunnel has a separate header and separate control means to regulate the temperature and humidity of the air supplied to the air jets of that tunnel, the control means providing all of the tunnels with substantially the same wet-bulb temperature and providing different dry-bulb temperatures in different tunnels.

* * * * *